United States Patent
Reid et al.

(10) Patent No.: US 12,182,261 B2
(45) Date of Patent: Dec. 31, 2024

(54) CONTROLLING USE OF DATA DETERMINED BY A RESOLVE-PENDING SPECULATIVE OPERATION

(71) Applicant: Arm Limited, Cambridge (GB)

(72) Inventors: Alastair David Reid, Cambridge (GB); Albin Pierrick Tonnerre, Sophia Antipolis (FR); Frederic Claude Marie Piry, Sophia Antipolis (FR); Peter Richard Greenhalgh, Cambridge (GB); Ian Michael Caulfield, Cambridge (GB); Timothy Hayes, Cambridge (GB); Giacomo Gabrielli, Cambridge (GB)

(73) Assignee: Arm Limited, Cambridge (GB)

( * ) Notice: Subject to any disclaimer, the term of this patent is extended or adjusted under 35 U.S.C. 154(b) by 540 days.

(21) Appl. No.: 17/310,008

(22) PCT Filed: Oct. 25, 2019

(86) PCT No.: PCT/GB2019/053032
§ 371 (c)(1),
(2) Date: Jul. 9, 2021

(87) PCT Pub. No.: WO2020/144446
PCT Pub. Date: Jul. 16, 2020

(65) Prior Publication Data
US 2022/0050909 A1     Feb. 17, 2022

(30) Foreign Application Priority Data
Jan. 11, 2019   (GB) .................................... 1900430

(51) Int. Cl.
*G06F 21/55*   (2013.01)
*G06F 9/38*    (2018.01)
*G06F 21/75*   (2013.01)

(52) U.S. Cl.
CPC .......... *G06F 21/556* (2013.01); *G06F 9/3842* (2013.01); *G06F 21/75* (2013.01)

(58) Field of Classification Search
CPC ...... G06F 9/3842; G06F 21/125; G06F 21/52; G06F 21/54; G06F 21/556; G06F 21/75; G06F 12/1483
See application file for complete search history.

(56) References Cited

U.S. PATENT DOCUMENTS 5,978,909 A * 11/1999 Lempel ................. G06F 9/3846
                                                  712/240
8,782,435 B1 *  7/2014 Ghose .................. G06F 11/1407
                                                  712/216
(Continued)

OTHER PUBLICATIONS

Lehman, Tamara Silbergleit, et al. "PoisonIvy: Safe speculation for secure memory", 2016 49th Annual IEEE/ACM International Symposium on Microarchitecture (MICRO), IEEE, Oct. 15, 2016, pp. 1-13, p. 5, col. 1, paragraph 5; p. 3, col. 1, paragraph III; p. 3, col. 2, paragraph A. Poison Propagation and Use.

*Primary Examiner* — Eric W Shepperd
(74) *Attorney, Agent, or Firm* — NIXON & VANDERHYE P.C.

(57) ABSTRACT

A data processing apparatus is provided which controls the use of data in respect of a further operation. The data processing apparatus identifies whether data is trusted or untrusted by identifying whether or not the data was determined by a speculatively executed resolve-pending operation. A permission control unit is also provided to control how the data can be used in respect of a further operation according to a security policy while the speculatively executed operation is still resolve-pending.

19 Claims, 9 Drawing Sheets

(56) References Cited

U.S. PATENT DOCUMENTS

| | | | |
|---|---|---|---|
| 10,394,716 B1* | 8/2019 | Piry | G06F 12/0871 |
| 2002/0194467 A1* | 12/2002 | Reilly | G06F 9/3842 |
| | | | 712/E9.05 |
| 2004/0133767 A1* | 7/2004 | Chaudhry | G06F 9/30105 |
| | | | 712/225 |
| 2005/0097304 A1 | 5/2005 | Luick | |
| 2005/0223200 A1* | 10/2005 | Tremblay | G06F 9/3844 |
| | | | 712/E9.05 |
| 2008/0109614 A1* | 5/2008 | Begon | G06F 11/1008 |
| | | | 712/E9.05 |
| 2013/0151891 A1* | 6/2013 | Piry | G06F 11/3058 |
| | | | 714/10 |
| 2014/0181485 A1* | 6/2014 | Scalabrino | G06F 9/3865 |
| | | | 712/233 |
| 2014/0317390 A1* | 10/2014 | Demongeot | G06F 9/3844 |
| | | | 712/239 |
| 2015/0100754 A1* | 4/2015 | Reid | G06F 9/3842 |
| | | | 712/6 |
| 2015/0100755 A1* | 4/2015 | Reid | G06F 9/38873 |
| | | | 712/7 |
| 2016/0357554 A1* | 12/2016 | Caulfield | G06F 9/3856 |
| 2017/0132010 A1* | 5/2017 | Vasekin | G06F 9/384 |
| 2018/0150297 A1* | 5/2018 | Batley | G06F 1/3287 |
| 2018/0293078 A1* | 10/2018 | Gabrielli | G06F 9/30036 |
| 2019/0138720 A1* | 5/2019 | Grewal | G06F 9/3863 |
| 2019/0332384 A1* | 10/2019 | Calhoun | G06F 9/3824 |
| 2019/0370001 A1* | 12/2019 | Teyssier | G06F 9/3806 |

* cited by examiner

CONTROLLING USE OF DATA DETERMINED BY A RESOLVE-PENDING SPECULATIVE OPERATION

TECHNICAL FIELD

This invention relates to the field of data processing. More particularly is relates to the speculative execution of data processing instructions.

BACKGROUND

A data processing apparatus may execute a sequence of instructions using an instruction pipeline. Some instruction pipelines use speculation to increase the utilisation of the instruction pipeline.

SUMMARY

At least one example described herein provides a data processing apparatus, comprising: an operation monitoring unit to identify whether data is trusted or untrusted by identifying whether or not the data was determined by a speculatively executed resolve-pending operation; and a permission control unit to control how the data can be used in respect of a further operation according to a security policy while the speculatively executed operation is still resolve-pending.

At least one further example described herein provides a method, comprising the steps of: identifying whether data is trusted or untrusted by identifying whether or not the data was determined by a speculatively executed resolve-pending operation; and controlling how the data can be used in respect of a further operation according to a security policy while the speculatively executed operation is still resolve-pending.

At least one further example described herein provides a data processing apparatus, comprising: means for identifying whether data is trusted or untrusted by identifying whether or not the data was determined by a speculatively executed resolve-pending operation; and means for controlling how the data can be used in respect of a further operation according to a security policy while the speculatively executed operation is still resolve-pending.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
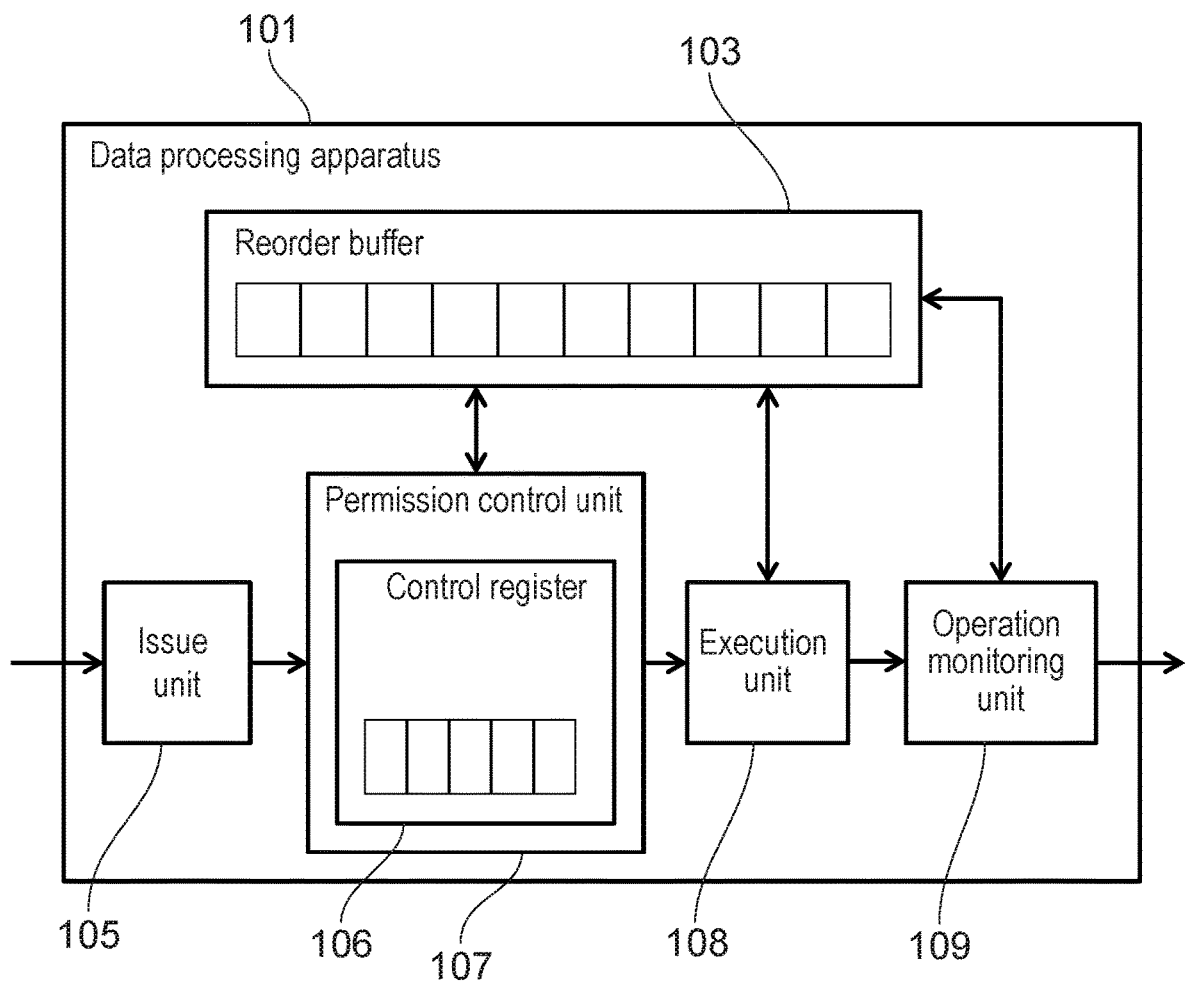
FIG. 1 illustrates an example of a data processing apparatus according to the present technique.

At least one example described herein provides a data processing apparatus, comprising: an operation monitoring unit to identify whether data is trusted or untrusted by identifying whether or not the data was determined by a speculatively executed resolve-pending operation; and a permission control unit to control how the data can be used in respect of a further operation according to a security policy while the speculatively executed operation is still resolve-pending.

The identification of whether data is trusted or untrusted provides an indication of whether the data may be at risk of causing privileged information to be leaked without being intended to. One of the ways in which data can be leaked is through the exploitation of vulnerabilities relating to speculatively executed operations as in, for instance, the Spectre and Meltdown vulnerabilities in which secret information is speculatively loaded, which manipulates the state of the cache hierarchy in such a way that an exploiting agent can later determine what the secret is based on the modified cache state. Such vulnerabilities may enable a malicious attacker to cause a processor to leak data which has been determined by a speculatively executed operation. Hence, data which is derived from a speculatively executed resolve-pending operation may introduce a security vulnerability. Data which is resolve-pending is data which has not yet affected the user-visible architectural state. Data which has been determined by a speculatively executed resolve-pending operation (e.g. a speculatively executed operation for which, at this time, it has not been determined whether that operation should have been executed) is defined as being 'untrusted'. This is because it may be the case that the data from that operation should not be available (e.g. if the operation should not have been performed), and so that data could be used to access information that should not be available (e.g. privileged information). For example, if a branch operation is mispredicted and causes two load operations to be speculatively executed in which the input of the second load operation is based on data loaded by executing the first load operation, then there is the potential for privileged data to be leaked. In this case, the first load operation may load privileged data and the second load operation may load data from an address based on the privileged data. Hence, the second load could trigger an eviction from a data cache in order to cache/buffer/allocate the loaded data. The part of the data cache that the evicted data is evicted from will depend on at least some of the bits of the privileged value loaded by the first load operation. An attacker, operating in a different process, processor or privilege level, may therefore observe a change in the cache state based on the second load operation and be able to infer the value of the privileged information. Therefore, by identifying whether or not data is trusted based upon whether or not it is determined by a speculatively executed resolve-pending operation it is possible to track data which is potentially malicious. By providing a permission control unit it is possible to control the management of untrusted data. This prevents certain further operations, as specified in the security policy, from being executed using untrusted data. However, the permission control unit does not restrict such further operations from being executed once the speculatively executed operation is no longer speculative (e.g. has been resolved) since once it has been resolved (e.g. is no longer speculative), the data which was determined by it can be trusted. Therefore, by controlling the use of data in respect of a further operation in this way, it is possible to reduce the capacity for data to be leaked.

In some examples, the operation monitoring unit is adapted to indicate that the data is other than trusted when it is identified that it is derived by the speculatively executed resolve-pending operation or by an operation performed using untrusted data.

Since an operation which is performed using untrusted data will have an output which depends on the untrusted data, there is a possibility that data which is derived based on data leaked as a result of the speculatively executed resolve-pending operation may be leaked. Therefore the present technique monitors which data is untrusted by being either derived by the speculatively executed resolve-pending operation itself as well as derived by an operation which uses such untrusted data.

In some examples, the indication of whether the data is trusted is provided by controlling a speculation flag associated with the data.

By providing a speculation flag to identify data which is determined by an operation executed past a branch that has not yet been resolved it is possible to track whether data in the pipeline has been determined by an operation which has been executed speculatively and thereby to control the use of speculative data by further operations.

In some examples, the operation monitoring unit is adapted to indicate that the data is trusted when it is identified that it was derived from something other than: a result of a speculatively executed resolve-pending operation; and an operation performed using untrusted data.

Data which is determined by a speculative operation which is still resolve-pending, or which is determined by an operation which uses such data is untrusted. That can mean that, depending on the security policy used by the permission control unit, further operations may be restricted in how they can use untrusted data. However, such restrictions often have performance costs since they might delay the execution of certain further operations. Therefore, it is desirable to determine when data can be trusted as effectively as possible. By indicating that data is trusted except in the limited circumstances of being a result of a speculatively executed resolve-pending operation or an operation using untrusted data, it is possible to reduce the delay of executing a sequence of instructions by indicating data to be trusted in all other situations. This enables the permission control unit to allow the use of such trusted data by further operations. A first example of where data may be trusted is when data is read from the architectural register file. This is because the results of speculatively executed operations are only written to the register file after being resolved. A second example of where data is trusted may be data which is an immediate value derived from the instruction itself. For instance, an add instruction could perform addition on the values '5' and '2', both of which are specified in the instruction. A third example of where data is trusted may be performing an arithmetic operation on a trusted value. This is because any data that is derived is derived purely from trusted values. In contrast, an access (e.g. load) operation that uses trusted data will derive data from a source that it might not be permitted to access.

In some examples, the indication of whether the data is derived by an operation performed using untrusted data is provided by controlling a trust flag associated with the data.

The use of a trust flag, indicating whether the data is derived from values speculatively loaded from memory, enables the operation monitoring unit to identify whether data is trusted based on the data used by the operation which determined it. This enables untrusted data to be identified even where such data is not directly determined by a speculatively executed resolve-pending operation, yet is determined by an operation which uses untrusted data. Since privileged data can be leaked as a consequence of a derivative of that data being written to memory, the identification of untrusted data using a trust flag improves the ease of identifying such untrusted data. This means that the permission control unit is able to identify which data can be trusted and which cannot be trusted, and is therefore able to more effectively control the use of data by a further operation based on its trust status.

There may be some instructions which have multiple outputs, in which case the multiple outputs may each have their own trust flag. Further, in some cases, the trust flag may be a counter represented in unary or binary (e.g. via a one-hot or one-cold representation) which tracks multiple unresolved branches which the associated data depends upon.

In some examples, the operation monitoring unit is adapted, in response to the speculatively executed operation being resolved, to indicate that the data is trusted.

Once a speculative operation has been resolved, the data can be trusted. This is because the resolution of speculation answers the question as to whether the instruction should have been executed. Accordingly, the trust indicator in respect of that data is updated to indicate that the data is trusted.

In some examples, the indication of whether the data is derived by an operation performed using untrusted data is provided by controlling a trust flag associated with the data, and wherein the operation monitoring unit is adapted to perform a trust status update operation to update the trust flag to indicate that the data is trusted by updating the trust flag when the speculation flag indicates that the speculatively executed operation is resolved.

When the speculatively executed operation is resolved, the speculation flag for that speculatively executed operation is updated to indicate that the operation is no longer speculative (e.g. that the speculatively predicted branch is resolved and was not mispredicted). Hence, the speculation flag for each operation which depends on data determined by that resolved speculatively executed operation can be updated to indicate that they are also no longer speculative. The trust flag associated with each item of data which is an operand or output of an operation (micro-operation) which depends on the speculatively executed operation can therefore be updated to indicate that it is trusted. For example, if the result of a speculatively executed branch operation is trusted (since the speculatively executed branch operation is resolved) then a further instruction which uses such a result is also trusted to the extent that the further instruction depends on trusted data. In this manner, the trust status of data used within chain of interdependent results and operands of successive operations can be updated.

In some examples, the data processing apparatus comprises: storage circuitry to store a speculation table to indicate, for a series of control flow operations, whether resolution of those control flow instructions has occurred, wherein the operation monitoring unit is adapted to indicate the data as trusted when one or more of the control flow operations that precede the speculatively executed resolve-pending operation are resolved.

In some processes, a plurality of subroutines may have been executed speculatively at once such that there are more than one unresolved speculative operations. Some examples of the present technique may prohibit this, or limit the number of simultaneous resolve-pending speculatively executed operations. In a case in which multiple speculatively executed resolve-pending branch operations are executed, they will be indicated in a speculation table. In some examples, the data may only be considered trusted if the branches in the speculation table that must be reached to execute the operation providing that data are resolved. Therefore, by indicating such data as trusted when each of these branches are resolved, it is possible to reduce the capacity for privileged information to be leaked by data which is inappropriately marked as being trusted.

In some examples, the speculation flag and the trust flag are indicated by fields of a micro-operation passed between stages of an instruction pipeline.

By indicating the speculation flag and trust flag in fields of a micro-operation it is possible to indicate to other operations in the instruction pipeline the trust status of each item of data. This makes it possible to enable data, which is granted permission by the permission control unit, to be used by a further operation.

In some examples, the permission control unit controls use of the data according to the security policy by configuring a control register to indicate whether the data can be used based on at least one of: whether the further operation would update the state of a given cache; an operation type of the further operation; and a trust flag of the further operation.

By providing a control register to represent the configuration of the security policy, it is possible to provide an easily configurable and accessible security policy. The permission unit uses the security policy to determine the conditions under which a given further operation may use data which is untrusted. Accordingly, by representing current settings of the security policy by adjusting the state of a sequence of flags in a control register, the permission control unit can easily look up the security policy settings for a given further operation and use that to determine whether it can use the data. The skilled person would recognise that hindering the use of (untrusted) data by a further operation may have performance costs, and therefore that there is a need to control the security policy in order to control the trade-off between performance and security by controlling how untrusted data can be used. Therefore, by specifying the security policy in a control register it is possible for the security policy to be updated in order to more easily configure the security policy based on the required balance between security and performance, given the requirements of a user.

Further, the control register may specify a series of conditions which may be used by the permission control unit to determine whether to allow the further operation to use untrusted data. By using the condition as to whether or not the further operation would update the state of a given cache, it is possible to allow a user to configure the security policy not to allow untrusted data to affect the cache such that the untrusted data could be accessed by another process. Also, by discriminating between different types of operations in respect of granting permission to the further operation, it is possible to allow certain operation types to use untrusted data. For example, some operation types do not store data or load data from memory and may simply perform numerical operations, such as an add instruction. Examples of various types of operations include load, store, add, shift and branch operations, among others.

In some examples, the further operation is a memory access operation to access further data; and the security policy inhibits the use of the data to perform the further operation when the data is untrusted.

Access operations, such as store operations and load operations, are used to access memory, and in doing so introduces a possibility for secret data to be loaded from memory or used to affect memory. Therefore, by using the security policy to inhibit the use of such data to perform the further operation when the data is untrusted, it is possible to prevent untrusted data from being allocated or buffered in the data cache and to prevent sensitive data from being leaked directly or indirectly, e.g. by monitoring line evictions. This improves the security of the data processing apparatus.

In some examples, the security policy stalls execution of the further operation while the data is untrusted.

There may be situations in which it is necessary to stall a subroutine at a further operation which is required to use untrusted data. This may be, for example, in a situation where the rest of the subroutine depends on a result of the further operation and yet it is unsafe to execute the further operation while the data is untrusted. In this case, the security policy may require that the program execution stalls. By doing so, untrusted data is prevented from being leaked to another process. In some examples, the speculation flag is set (i.e. equal to 1) when the data is determined by a resolve-pending speculatively executed operation (e.g. an operation that has been speculatively executed where it is still not yet known whether that instruction should have been executed) and the trust flag is unset (i.e. equal to 0) when the data is untrusted. Accordingly, a further operation such as a store, may stall until the logical AND of the speculation flag (S) and the trust flag (T) is zero. Since stores already stall until the load is not speculative, in the case in which S=1 and T=0, there is still a stall for stores.

In addition to stalling, it may be desirable to record that an issue, such as untrusted data being determined, occurred such as in an architectural register so that software can determine the trust status of data and respond accordingly, or such that hardware can read the trust status as indicated by the architectural register and respond accordingly when transferring to a lower privilege level (e.g. from an operating system back to a user application). In these cases, the software or hardware may respond by, for example, triggering a full or partial cache flush. There may also be a performance counter or a trace to track the number of stalls performed as a result of untrusted data in order to assist in debugging or in the detection of malicious processes.

In some examples, the security policy permits the execution of one or more other operations while the data is untrusted.

There may be some situations in which other operations after the further operation can be executed without the further operation being completed. Accordingly, while the further operation may be prevented from being executed, such as by being stalled, the other operations can continue to be executed if they can be so without requiring the result of the further operation. This could, for example, be the case during out-of-order processing in which instructions in a sequence of instructions are not necessarily executed in the order in which they appear in the program, but are instead executed based on the availability of resources in the instruction pipeline. This means that even if there is some data which is indicated to be untrusted by the operation monitoring unit, other operations can be executed to increase the utilisation of the instruction pipeline.

In some examples, the security policy treats the further operation as a NOOP (no operation) operation or a memory prefetch operation when the data is untrusted.

There may be situations in which the execution of a particular operation is not critical to the operation of the program. For example, there may be operations (such as prefetch instructions) which normally have the effect of improving the efficiency but do not affect the final output of a particular subroutine. In these cases, it may be desirable to configure the security policy to treat the further operation as a NOOP operation. This enables the program to continue and prevents it from stalling.

In some examples, the permission control unit is adapted to selectively grant permission to the further operation to use the data by performing a permission determination operation by comparing a corresponding portion of the control register with at least one of: whether the further operation would update the state of a given cache; the operation type of the further operation; and the trust flag of the further operation.

By providing specific portions of the control register to indicate specific conditions for allowed use of data there is an efficient mechanism for controlling the permission of further operations by the permission control unit. It enables the permission control unit to easily perform a lookup in a portion of the control register, for example, by performing an index into a portion of the control register to identify a bit value, and thereby to easily and efficiently determine the current configuration of the security policy in respect of the relevant conditions for a given further operation.

In some examples, the speculatively executed operation is a speculative branch operation.

In situations where a branch condition is not yet determined, often a branch will be speculatively executed based upon a predicted most-likely outcome of the branch condition, using a branch predictor. Accordingly, the instructions which are included within the subroutine which are predicted to be needed are executed speculatively. Hence, by controlling the use of data by further operations based on whether a branch operation which is still resolve-pending determined the data, it is possible to improve the security of branch prediction by reducing the capacity for data to be leaded through mispredicted speculative branch operations.

In some examples, the security policy is adapted to prevent a speculative branch which is dependent on untrusted data.

There may be reasons why a user would want to prevent speculative branches from being executed if they depend on untrusted data. For example, if the data which they depend on is untrusted, then they may lead data into the predicted branch which, depending on the instructions of the further speculative branch which are executed, could cause sensitive data to be leaked.

In some examples, the data processing apparatus further comprises a plurality of architectural or microarchitectural registers to store an indication of the trust flag.

Some particular embodiments will now be described with reference to the figures.

FIG. 1 illustrates an example of a data processing apparatus 101 according to the present technique comprising a reorder buffer 103, an issue unit 105, permission control unit 107 comprising a control register 106, an execution unit 108 to execute instructions issued by the issue unit 105, and an operation monitoring unit 109.

Issued instructions are executed using out-of-order processing by executing the instructions in an order which might not correspond to the order in which the instructions are located within an executable program file. In this case, data output by instructions may be stored in the reorder buffer 103. The reorder buffer 103 comprises a plurality of data entries to store data derived by operations executed using out-of-order processing. Data stored in the reorder buffer 103 may then be used when executing other operations which depend on the results of previously executed operations. The data stored in the reorder buffer 103 may be resolved in-order (i.e. in the original order in which the instructions appear in the program) i.e. stored in a register or in memory.

The issue unit 105 is arranged to issue instructions provided by an instruction cache. The permission control unit 107 is adapted to control how data can be used. The data may be data provided as an operand of an issued instruction or data available at a memory location with an address referred to by the issued instruction. The permission control unit 107 controls how the data can be used based on a security policy. The security policy may be specified by a user of the data processing apparatus 101 and may be stored in a control register 106. The permission control unit determines whether the data can be used based on the conditions set out by the security policy. For example, the security policy may specify that the data should be prevented from being used by a further operation (i.e. a further instruction issued by the issue unit) if the further operation would update the state of a given cache. Alternatively, the security policy may prevent use of the data by a further operation based on the operation type of the further operation. For example, the control register may be arranged to indicate that the data cannot be used by a further operation if the further operation is a load operation or a store operation. Additionally, the security policy may specify that the data cannot be used by a further operation which is indicated as untrusted.

The execution unit 108 may comprise an Arithmetic Logic Unit (ALU) among other computational units which execute issued instructions. The output of the execution unit is sent to the operation monitoring unit 109 which is configured to identify data which has been determined by a speculatively executed operation which is still resolve-pending (e.g. a speculatively executed instruction that is still pending and therefore still unresolved). If the data is determined to have been produced by a speculatively executed operation which is still resolve-pending then it is indicated to be untrusted. Otherwise the data is not indicated as untrusted. In this example, the indication of whether or not the data is trusted is provided by a trust status indicator such as a trust flag which may be set or unset to indicate a trust status of the data. The operation monitoring unit may then output the data to a further stage of the instruction pipeline to be allocated to a cache, be written to memory or allocated in a temporary register.

Figure 2:
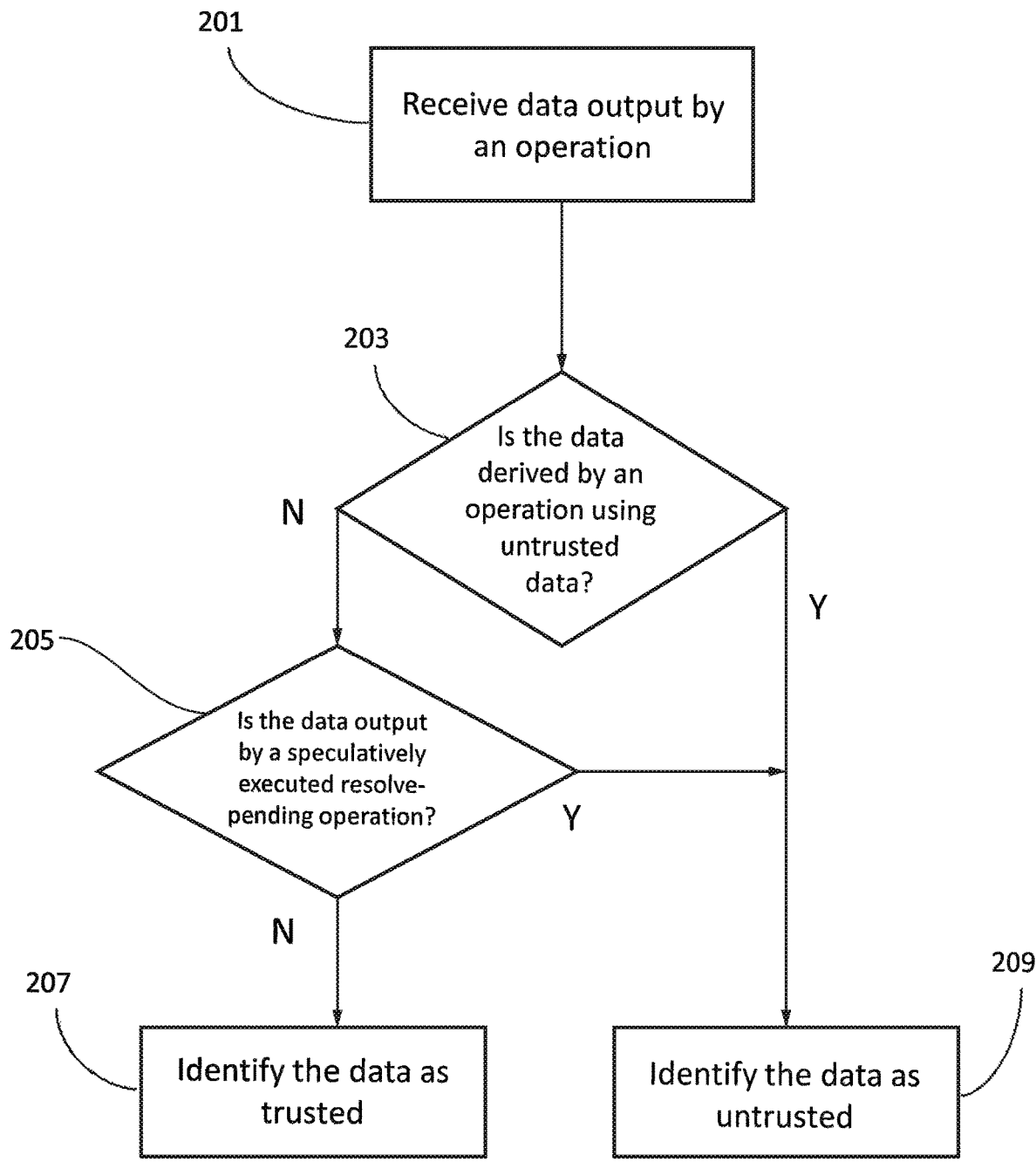
FIG. 2 illustrates an example of a method performed by the data processing apparatus according to the present technique.

FIG. 2 illustrates an example of a method performed by the data processing apparatus 101 in order to identify whether the data is trusted or untrusted. The method begins at step 201 in which data output by an operation is received. This data may, for example, be the output of an operation based on an issued instruction and executed by the execution unit 108. At step 203, it is determined whether the data is the data is derived by an operation using untrusted data (e.g.

whether the operation for which the data is a result had untrusted data as an input operand). If the data is determined to have been derived using untrusted data then, at step 209, the data is identified as being untrusted. Otherwise, at step 205, the data is output by a speculatively executed resolve-pending operation (e.g. whether the instruction was speculatively executed and it is still unknown as to whether the instruction should have been executed). If step 205 determines that the data is output by a speculatively executed resolve-pending operation then the method proceeds to step 209 at which the data is identified as being untrusted. However, if the data is determined not to be output by a speculatively executed resolve-pending operation then the method proceeds to step 207, where the data is classified as trusted.

Figure 3A:
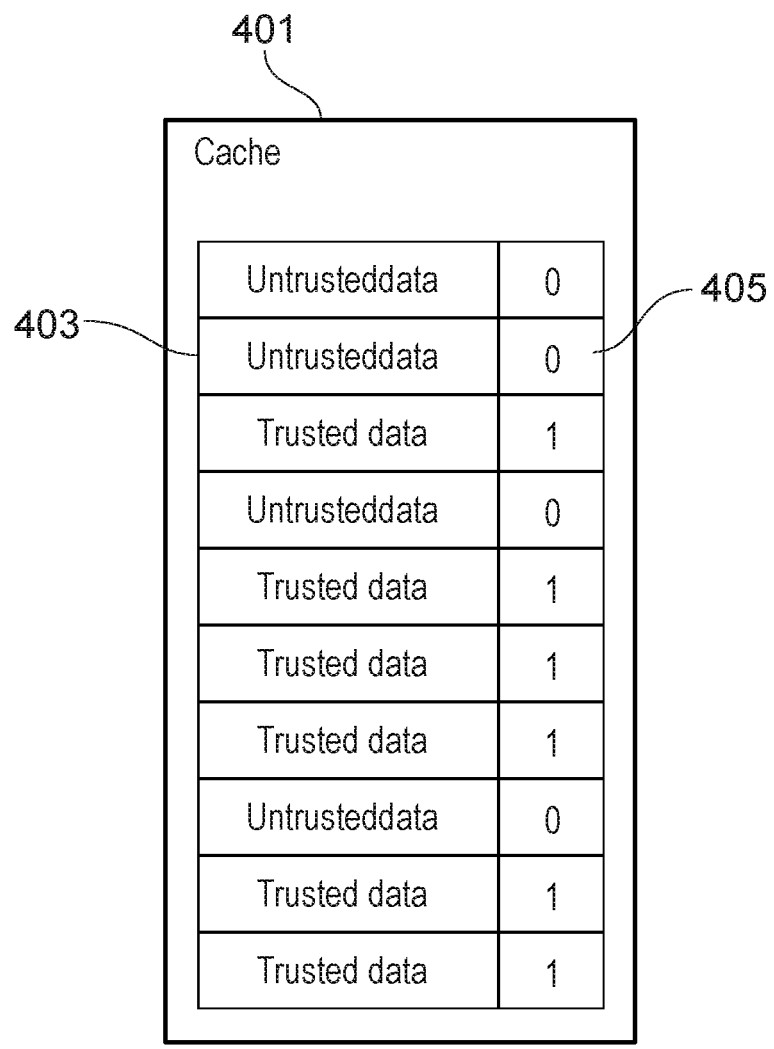
FIG. 3a illustrates an example of a cache used by the data processing apparatus of the present technique.
Figure 3B:
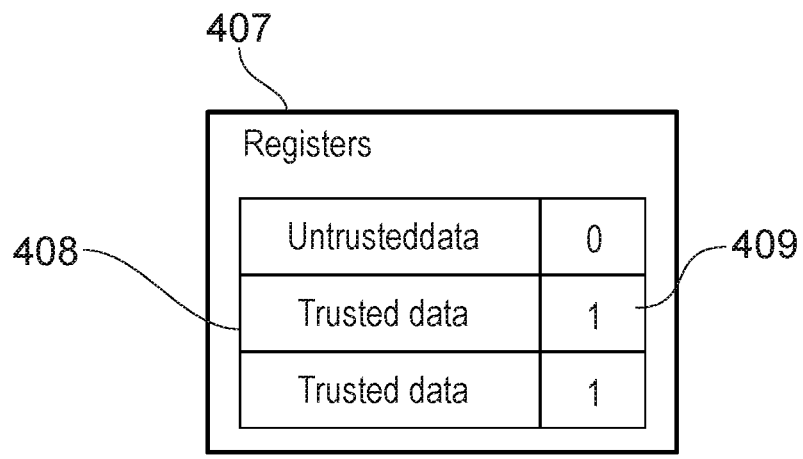
FIG. 3b illustrates an example of a set of architectural registers used by the data processing apparatus of the present technique.

FIG. 3a illustrates an example of a cache 401 comprising a plurality of data entries 403 storing data determined by an operation executed by the execution unit 108. The cache may be comprised within the data processing apparatus or be external to it. Further the cache may be a data cache, such as a data cache or a level 2 cache of a hierarchical cache architecture. For each entry 403, the cache comprises a trust flag 405 which provides an indication of whether the data allocated in a corresponding entry 403 is trusted. FIG. 3b illustrates an example of a plurality of registers 407 (e.g. physical registers) wherein each register entry 408 also comprises a trust flag 409 to indicate whether or not the data resident in a corresponding register entry 408 is trusted.

Figure 4:
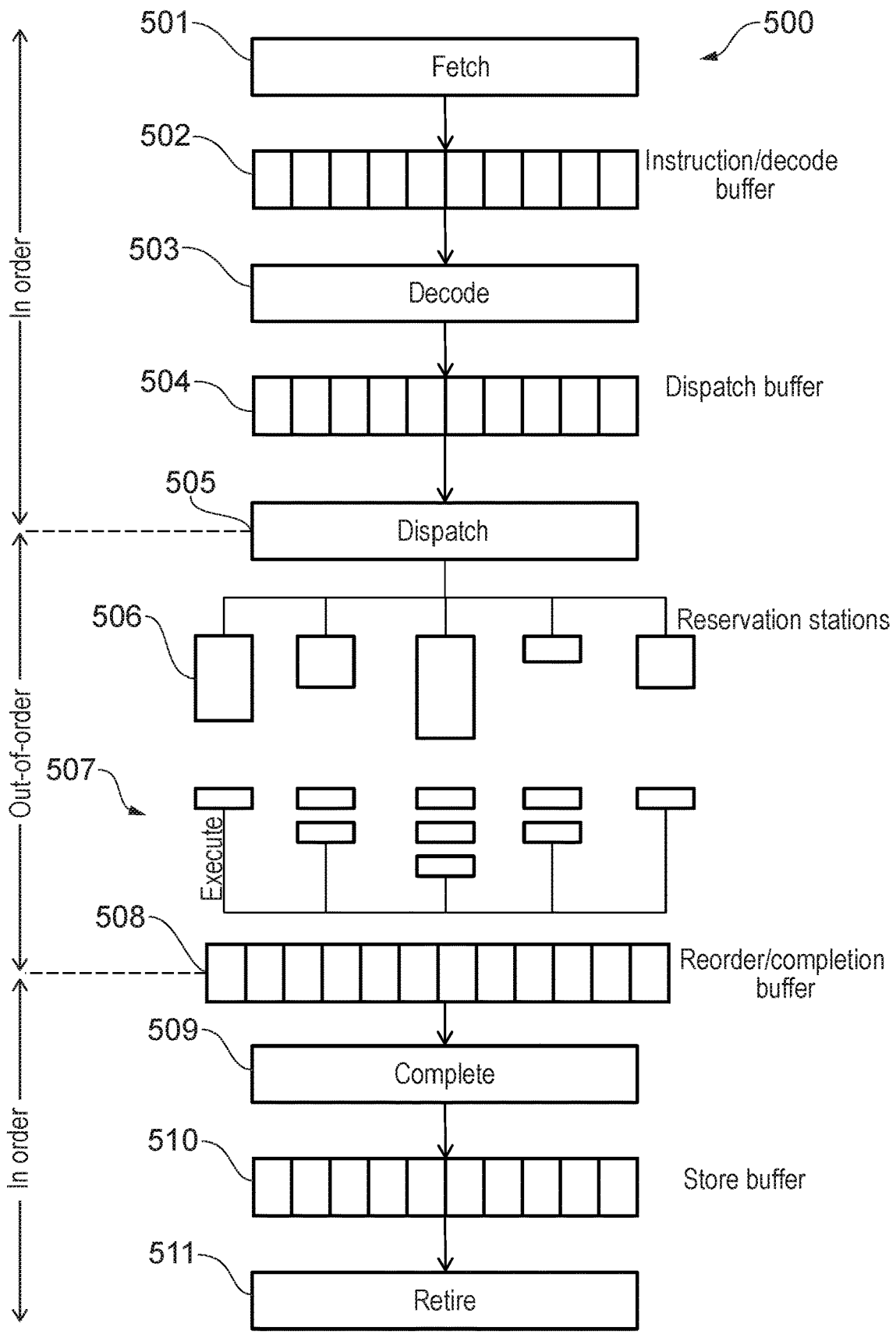
FIG. 4 illustrates an example of an instruction pipeline used by the data processing apparatus of the present technique.

FIG. 4 illustrates an example of a processor pipeline 500 if the data processing apparatus 101 comprising a plurality of stages. The pipeline 500 comprises a fetch stage 501 to retrieve instructions from memory; a decode stage 503 to decode instructions to control the control lines to other parts of the processor based on the decoded instruction; a dispatch stage 505 to send an operation to at least one of a plurality of reservation stations 506 to queue in preparation to be scheduled for out-of-order execution at an execution stage 507; a complete stage 509 to prepare data to be written back to memory once the out-of-order results have been reassembled in-order; and a retire stage 511 indicating the end of the pipeline. A respective buffer is provided between each stage of the pipeline to store data waiting to proceed to the next stage. An instruction buffer 502 is provided after the fetch stage 501 and before the decode stage 503 to store fetched instructions waiting to be decoded. A dispatch buffer 504 stores decoded operations which are waiting to be dispatched at the dispatch stage 505. A reorder buffer 508 (completion buffer) is provided after the execution stage 507 to store the results of a given executed operation, and a store buffer 510 is provided after the complete stage 509 to await store operations to memory. In an out of order processor, operations which have been dispatched but not yet re-ordered at the complete stage 509 are out-of-order. In some examples, the micro-operations which are described later with reference to FIGS. 5 to 9 comprise a speculation flag and a trust flag and are passed between each of at least a subset of the stages of the instruction pipeline 500.

Figure 5:
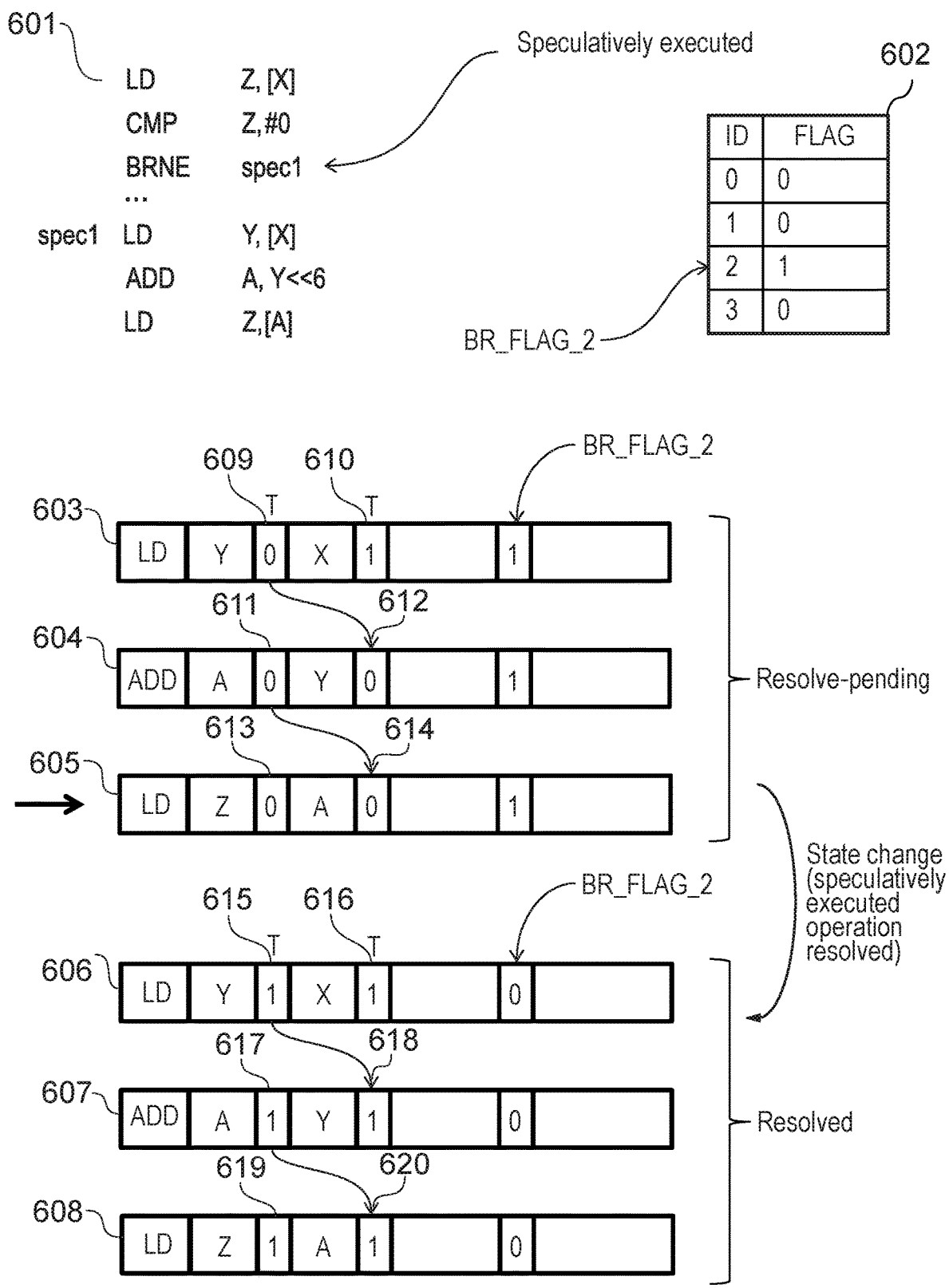
FIG. 5 illustrates an example of an update operation of the operation monitoring unit of the data processing apparatus of the present technique.

FIG. 5 illustrates an example of an update operation of the operation monitoring unit to update the trust flags and speculation flag of a given micro-operation to indicate that data which it determined is now trusted. In this example, a program 601 specifies that a load micro-operation 603 should be executed as a first operation of a new branch, and this part of the program will be speculatively executed until the branch instruction is resolved.

Accordingly, as shown in FIG. 5, a speculation flag (BR_FLAG_2) is set in the operation (micro-operation) 603 that makes up the first instruction of the branch, in order to indicate that the load operation 603 is executed speculatively. In some examples, the speculation flag which is set may be one from among a plurality of speculation flags and corresponds to a given speculative branch operation. This is shown in more detail with respect to FIG. 6. It is thereby possible to track which speculative micro-operations are resolve-pending. A speculation table 602 may store an indication of which speculative micro-operations are still resolve-pending. The speculation table 602 comprises a plurality of entries which each correspond to a given identity (e.g. ID number). When an operation is executed speculatively, it may be assigned an ID number from the speculation table and the flag of the speculation table which corresponds to that ID number is set. This indicates that the operation which is executed speculatively is resolve-pending. The ID number which is assigned to the speculatively executed operation corresponds to the flag of the micro-operation which is set. For example, as shown in FIG. 5, the entry of the speculation table with an ID number of 2 is assigned to the speculatively executed branch instruction illustrated by the program 601. Accordingly, the speculation flag of the micro-operation 603 which corresponds to the ID number 2 (i.e. the BR_FLAG_2 flag) is set. Accordingly, the same flag for each further micro-operation 604 and 605 which is executed within that branch operation is also set.

Here, we assume that the value X is trusted, therefore a corresponding trust flag 610 in the load micro-operation 603 is set to indicate that it is trusted. However, since the load has been performed speculatively, the value Y to which the value at address [X] has been loaded to is marked as untrusted by the trust flag 609. Accordingly, for micro-operations 604 and 605, the trust flags 611, 612, 613 and 614 corresponding to untrusted values are indicated as such and the speculation flag is also set indicating that the micro-operations 604 and 605 are executed in dependence on the speculative branch operation 603. Micro-operations 606 to 608 correspond to the same micro-operations 603 to 605, yet show how the speculation flag and each of the trust flags are updated when the speculative branch (BRNE (branch if not equal)) is resolved. As shown at operation 606, when the dependent branch is resolved, the speculation flag BR_FLAG_2 is unset which enables the trust flag 615 for the operand Y to indicate that Y is now a trusted value. Accordingly, the trust flag 618 for the second operand of micro-operation 607 (storing the value of Y in this example) is updated to indicate that Y is now a trusted value. The result of the add operation of 607 is an operand of the subsequent load operation in this example and the trust flag 617 of the result of the micro-operation 607 is set. Since the operand is now trusted, the trust flag 620 for the input operand of micro-operation 608 is set to indicate that it is now trusted. Hence, the output Z of the load operation 608 is indicated to be trusted by the trust flag 619 since it is derived from trusted data (the value "A", which is now indicated to be trusted by trust flag 620) by an operation which has now been resolved.

Figure 6:
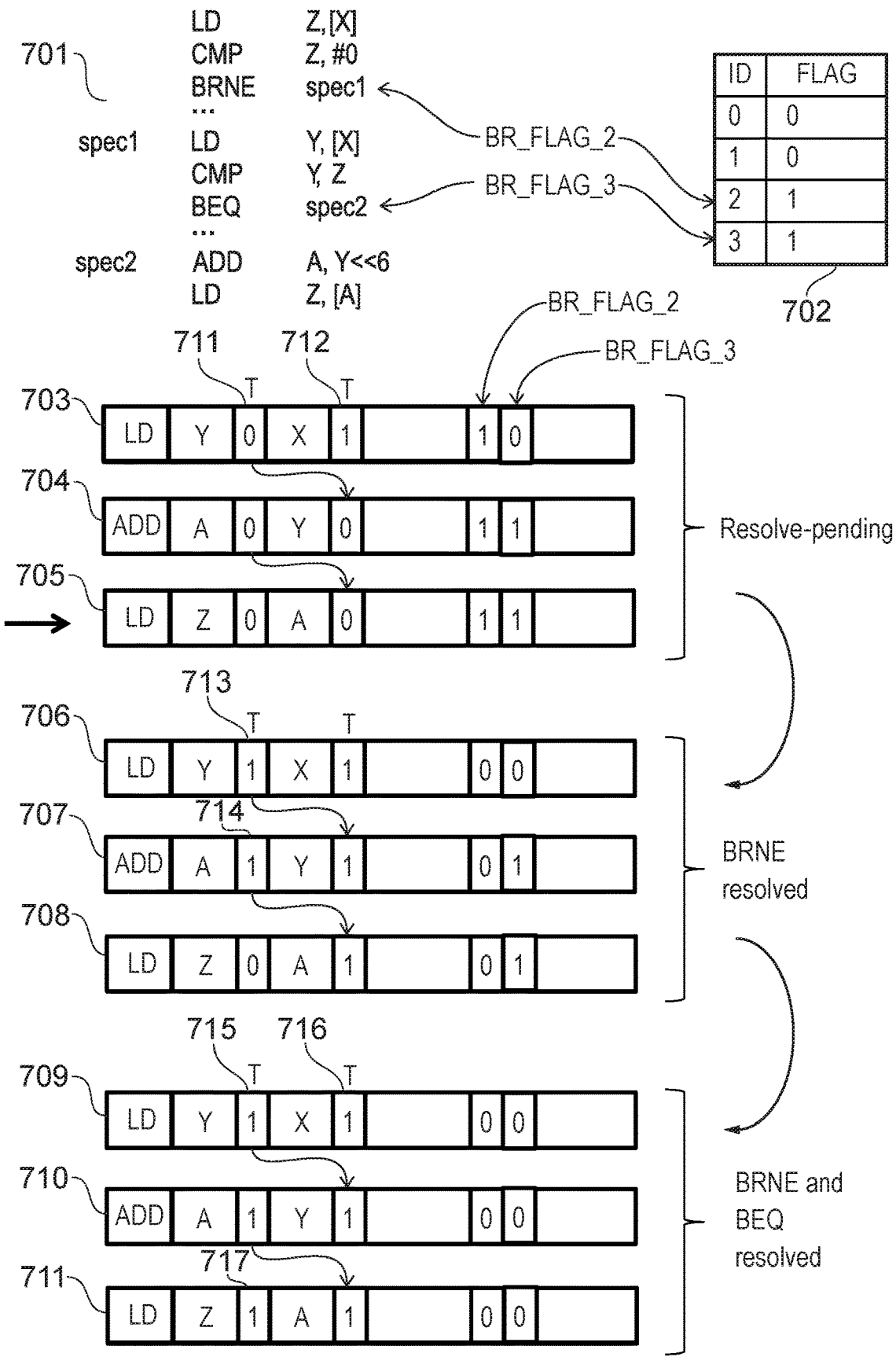
FIG. 6 illustrates another example of an update operation of the operation monitoring unit of the data processing apparatus of the present technique.

FIG. 6 illustrates an example of an update operation of the operation monitoring unit to update the trust flags and speculation flag of a given micro-operation. In this example, a plurality of speculative branches are taken as illustrated by the program 701. Therefore, the values which are determined by an operation within both branches while they are both resolve-pending are not trusted and require both speculative branches to be resolved before they can be trusted. Therefore, this example illustrates a situation in which two speculatively executed branch operations resolve on different cycles and illustrates how the trust flags are updated accordingly. In the program 701, two separate branches are illustrated (a BRNE operation and a branch if equal (BEQ) operation). As illustrated by the arrow at micro-operation 705, at the point at which the final load instruction of the program 701 is executed, the speculation table 702 has been updated to allocate two available speculation indicators (flags) to each of the two speculative branch operations. The speculation table 702 comprises a plurality of speculation flags which can be assigned to respective speculatively executed operations. In this example, the entries of the speculation table which correspond to ID numbers 2 and 3 have been allocated to the speculatively executed branches which begin at "spec1" and "spec2" of the program 701 respectively. The micro-operations 703 to 711 each contain a respective speculation flag for each of the ID numbers of the speculation table 702. Hence, when a given speculative branch operation has been executed, the corresponding speculation flag of a micro-operation which is executed within that branch is updated. For example, the micro-operation 703 is the load instruction performed at line 4 of the program 701 which is executed within the first speculative branch ("spec1"). Since micro-operation 703 is performed within the first branch, but before the second branch is speculatively executed, the speculation flag (BR_FLAG_2) associated with the first speculatively executed branch operation is set yet the speculation flag (BR_FLAG_3) associated with the second speculatively executed branch operation is not set. However, these two speculation flags are set for micro-operation 704 to indicate that both resolve-pending speculatively executed branch operations must be resolved before the output Z of the load operation can be trusted. It will be appreciated that the labels BR_FLAG_2 and BR_FLAG_3 refer to the two speculation flags for each of the micro-operations 703 to 711.

The micro-operations from 706 to 708 represent the same set of micro-operations as illustrated at 703 to 705 however they are in a different state. In particular, as illustrated at 706, the first speculative branch operation (BRNE) has been resolved and the corresponding speculation flag has been updated accordingly. Further, the trust flag 713 at 706 for the operand Y has been updated to reflect the fact that the corresponding micro-operation is now trusted. Since the add operation at 707 is based entirely on trusted data, its output is trusted as indicated by the trust flag 714 for the operand A. However the second speculative branch operation (BEQ (branch if equal)) has not yet been resolved and the speculation flag corresponding to that branch operation (BR_FLAG_3) is therefore still set. Hence, the final load operation of the program 701 has not yet been resolved and is therefore still untrusted. The micro-operations from 709 to 711 represent the same set of micro-operations as illustrated at 703 to 705 however they are in a different state (i.e. at a different point in time). Once the second speculative branch operation (BEQ) is resolved, the corresponding speculation flag at both 710 and 711 is updated. Note that since the first micro-operation 709 did not depend on the BEQ instruction there is no change to BR_FLAG_3 for that micro-operation. Since both speculative branch operations are now resolved the output of the final load instruction is updated to indicate that it is trusted, as shown by the trust flag 717 at micro-operation 711.

Figure 7:
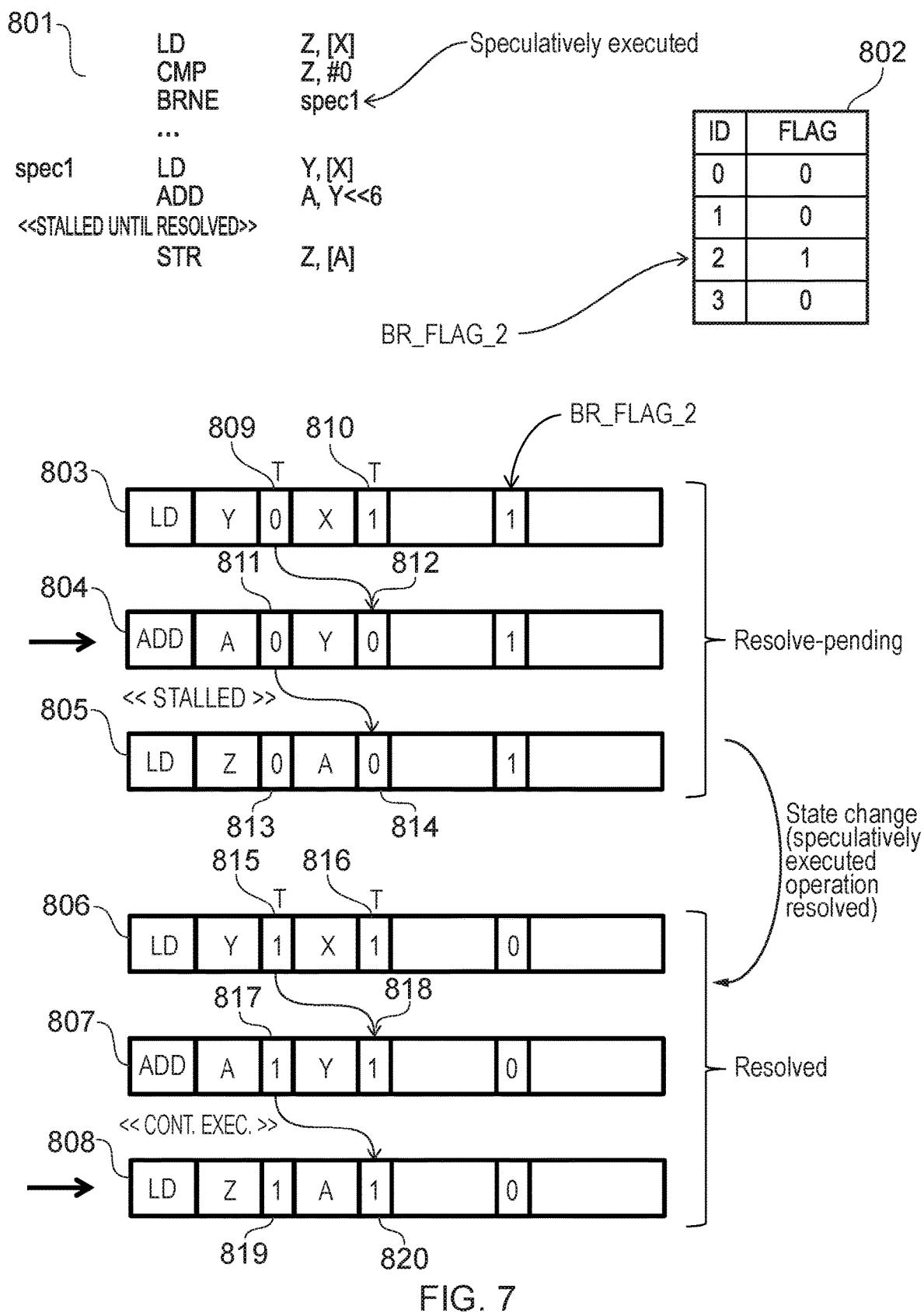
FIG. 7 illustrates an example of an instruction stall when a further operation depends on untrusted data.

FIG. 7 illustrates an example of a stalled execution as a result of a further operation requiring use of untrusted data. The program 801 illustrates a program comprising a single branch instruction which, in this example, is speculatively executed. The speculation table 802 is illustrated to show an entry which has been allocated to the speculatively executed branch operation (ID number 2). Accordingly, the speculation flag for each of the micro-operations illustrated at 803 to 805 has been set. The branch instruction branches to "spec1" to perform a load (LD) operation, an add (ADD) operation and a load (LD) operation. Since the input to the first load operation is trusted, the first load operation can be executed. In addition, the add operation can be executed since the security policy is configured to allow add operations. However, in this example, the security policy is configured to stall on an operation which would update the state of the cache based on untrusted data. As shown by the arrow at 804, after the add instruction is performed the program execution stalls because the second load instruction (LD) requires use of untrusted data.

Micro-operations 806 to 808 illustrate the same micro-operations as are shown at 803 to 805 but in a different state (i.e. once the speculatively executed branch operation has been resolved). Once the speculatively executed branch instruction is resolved, the speculation flags for the micro-operations 806 to 808 are updated to be unset. The trust flag 815 is then updated to indicate that the output of the first load operation 806 is trusted and therefore the trust flag 818 is also set. The output of the add operation 807 can therefore be trusted since it is derived from data which is now trusted, so its trust flag 817 is updated accordingly. Since the data which is used as an input operand to the second load operation 808 is now trusted, as indicated by the trust flag 820, it is permitted to execute. Accordingly, its execution is no longer stalled. Hence, the execution of the program 801 can continue to determine the value Z. Since the value Z is determined based on trusted data and since the branch operation is resolved, it is trusted as indicated by the trust flag 819.

Figure 8:
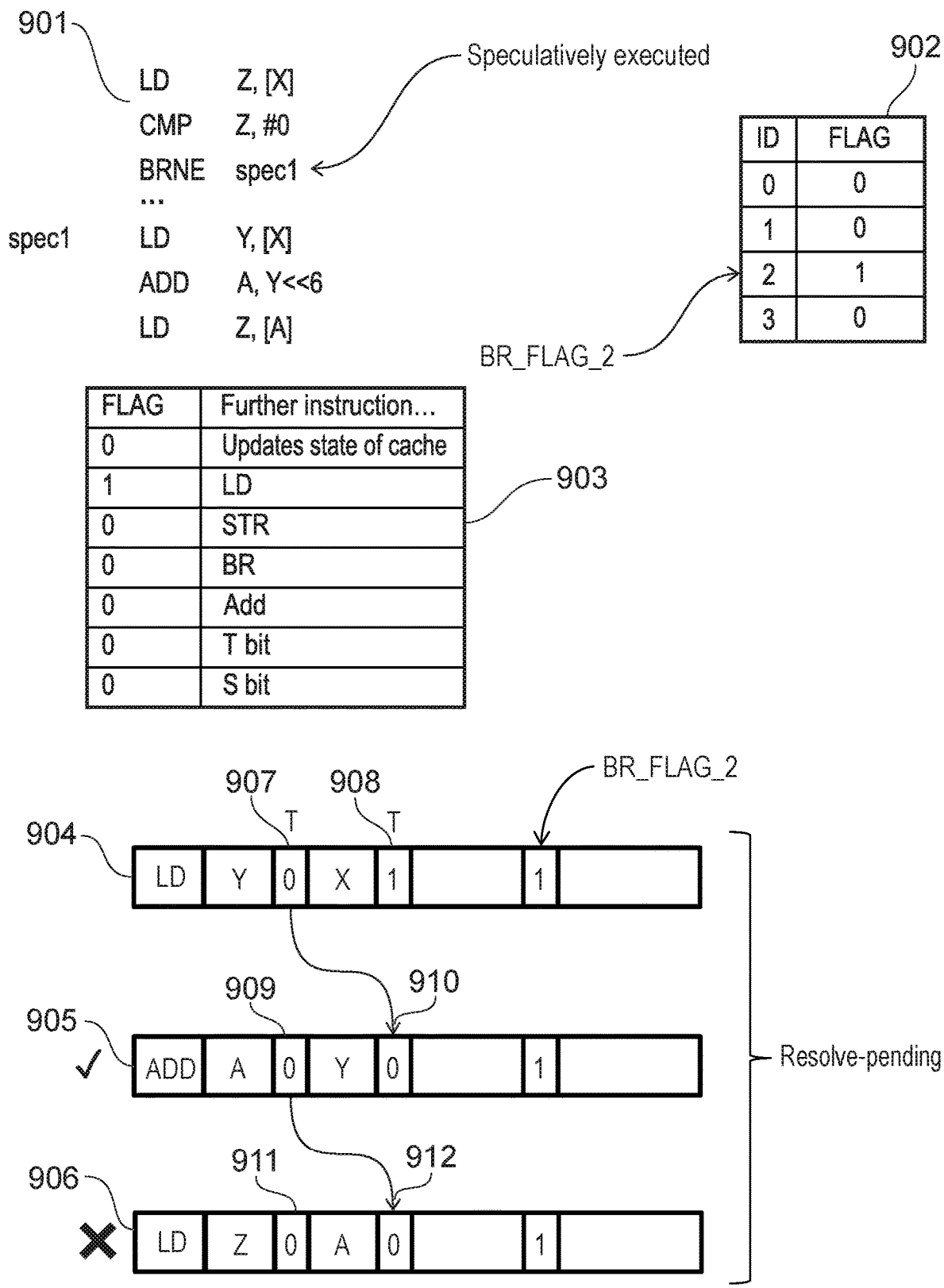
FIG. 8 illustrates an example of a control register to control use of data by a further operation.

FIG. 8 illustrates an example of a security policy being used by a permission control unit in order to control the execution of further instructions which use untrusted data. In this example, a control register 903 is provided to specify the security policy. The control register 903 comprises a plurality of flags which can be set or unset in order to determine how data can be used in respect of a further operation.

For example, the security policy may be configured to determine whether a further operation may use untrusted data based on whether the further operation would update the state of the cache; based on the operation type of the further operation (i.e. load, store or branch etc.); or based on whether the further operation itself is trusted. In addition, a program 901 is provided which performs a sequence of instructions including a branch instruction which is speculatively executed. The branch begins at the load instruction indicated by the label "spec1". FIG. 8 also illustrates a speculation table 902 as previously described.

In the example shown in FIG. 8, the flag column of the control register 903 comprises a plurality of rows which each indicates whether the condition to which a given entry (row) corresponds is set. For example, the first row of the control register 903 relates to the condition that the further instruction would update the state of the cache. Hence, if the flag corresponding to that condition is set, then the security policy would prevent a further instruction from using untrusted data if it would update the state of the cache. In FIG. 8, the flag corresponding to the load instruction condition is set indicating that further instructions which are load instructions may not be executed using untrusted data. As shown at 904, the load instruction is executed to load the value at X into the variable Y. Since this load microoperation is executed speculatively, the speculation flag BR_FLAG_2 (corresponding to the entry of the speculation table which this branch is assigned to) is set. Accordingly, even though the value X is trusted (since, in this example, it is not determined by a resolve-pending operation) as indicated by the trust flag 908, the value Y generated by the load instruction is not trusted, as indicated by the trust flags 907 and 910. Since the control register 903 does not prevent use of untrusted data by add instructions the add micro-operation 905 is executed, however the output is still untrusted, as indicated by the value of the trust flag 909. The final load instruction 906 however is prevented from being executed since the flag corresponding to the load instruction condition of the control register 903 is set. This indicates that the security policy, as determined by the control register, specifies that a further operation may not use untrusted data as the input of a load instruction. By setting this flag of the control register, the data processing apparatus can be prevented from leaking data by loading data from memory based on a value determined by a speculatively executed resolve-pending operation.

Figure 9:
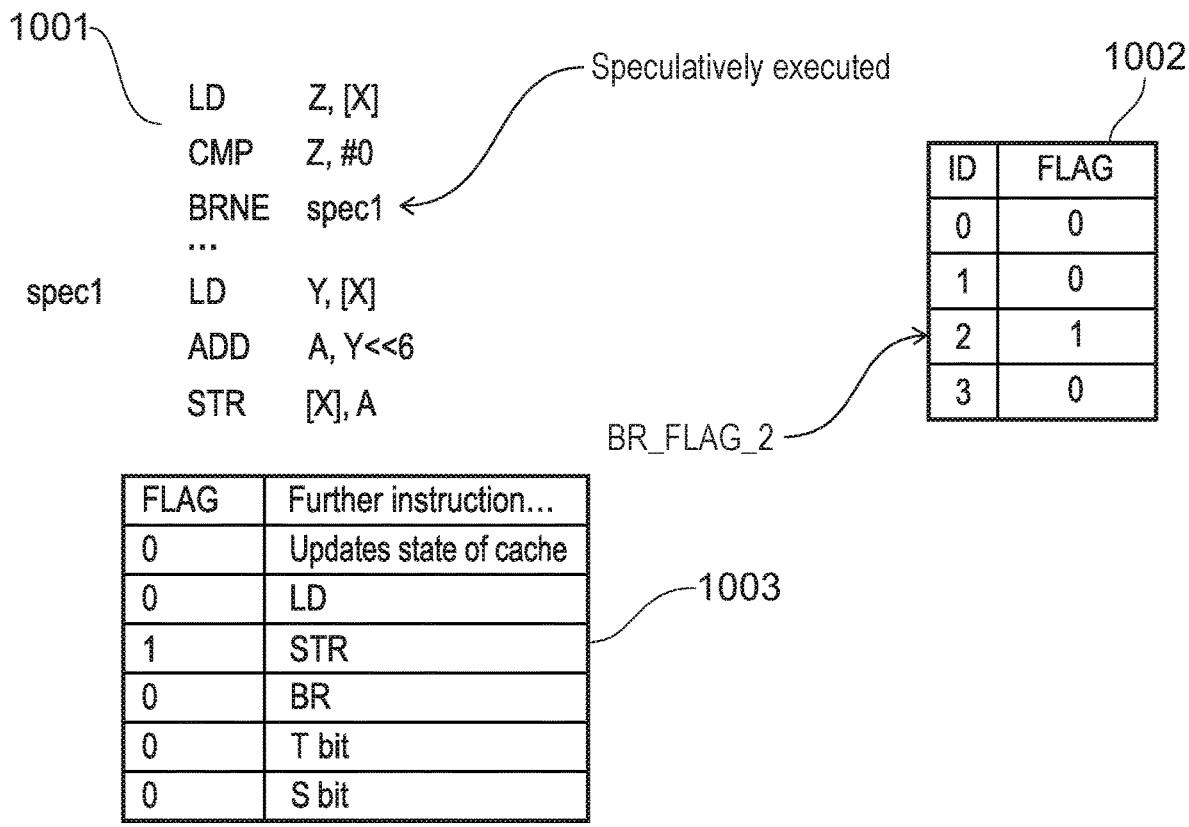
FIG. 9 illustrates an example of a control register to control use of data by a further operation.
Figure 9:
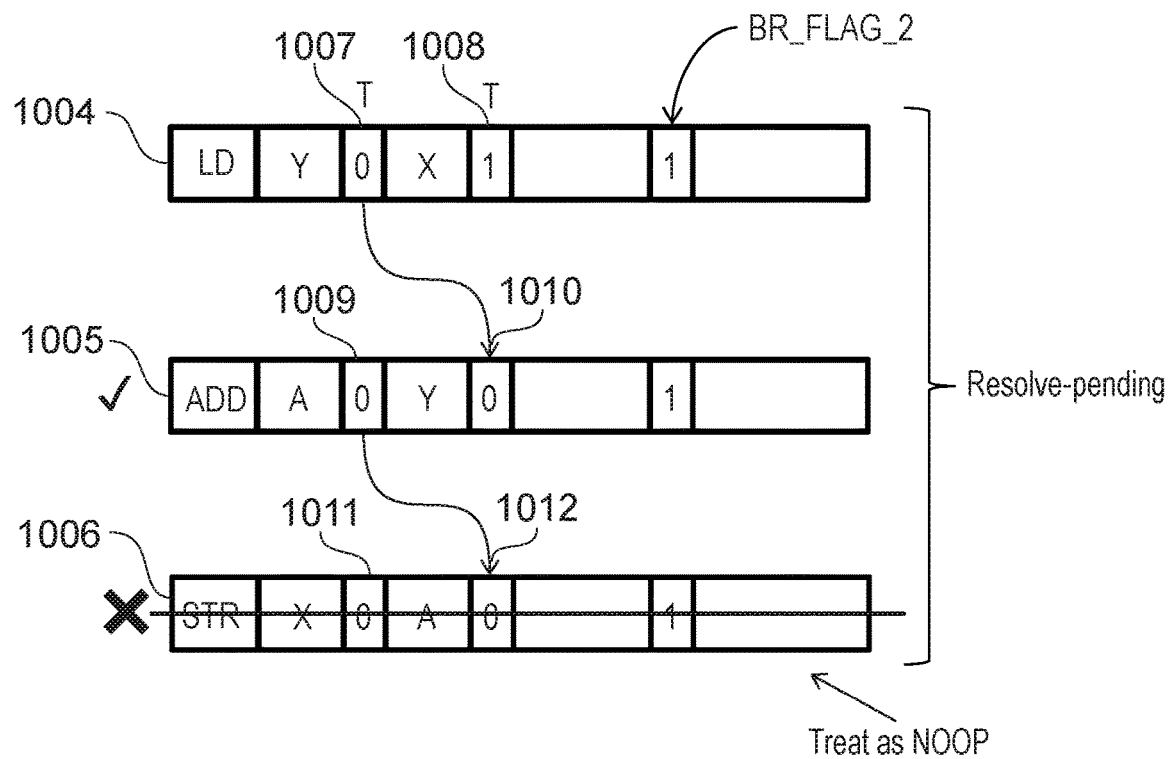

FIG. 9 illustrates an example of a security policy being used by a permission control unit in order to control the execution of further instructions which use untrusted data. The control register 1003 is the same control register as was described with reference to FIG. 8, however its configuration is different. In this example, the control register 1003 is provided to specify the security policy. The control register 1003 comprises a plurality of flags which can be set or unset in order to determine how untrusted data can be used in respect of a further operation. For example, the security policy may be configured to determine whether a further operation may use untrusted data based on whether the further operation would update the state of the cache; based on the operation type of the further operation (i.e. load, store or branch etc.); or based on whether the further operation itself is trusted.

In the example shown in FIG. 9, the flag at the control register 1003 corresponding to the store instruction (STR) condition is set indicating that further instructions which are store instructions may not be executed using untrusted data. As shown at 1004, the load instruction is executed to load the value at X into the variable Y. Since this load micro-operation is executed speculatively, the speculation flag BR_FLAG_2 (corresponding to the entry of the speculation table which this branch is assigned to) is set. Accordingly, even though the value X is trusted (since, in this example, it is not determined by a resolve-pending operation) as indicated by the trust flag 1008, the value Y generated by the load instruction is not trusted, as indicated by the trust flags 1007 and 1010. Since the control register 1003 does not prevent use of untrusted data by add instructions the add micro-operation 1005 is executed, however its output is still untrusted, as indicated by the value of the trust flag 1009. The final load instruction 1006 however is prevented from being executed since the flag corresponding to the load instruction condition of the control register 1003 is set. This indicates that the security policy, as determined by the control register, specifies that a further operation may not use untrusted data as the input of a load instruction. By setting this flag of the control register, the data processing apparatus can be prevented from leaking data by loading data from memory based on a value determined by a speculatively executed resolve-pending operation. In this instance, it is treated as a NOOP which may, for example, be specified by the security policy. In some embodiments, a software prefetch instruction is issued in place of the NOOP instruction thereby making it possible to take advantage of a situation in which no other instruction would otherwise be executing to improve performance of the system. Accordingly, the user is able to control the use of untrusted data in order to optimise the trade-off between performance and security. There may be some instruction types which are non-critical to the working of the program execution. Therefore, by treating the operation as a NOOP, the program execution may continue, reducing the negative impact on performance.

In the present application, the words "configured to . . ." or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A data processing apparatus, comprising:
operation monitoring circuitry to identify whether data is trusted or untrusted by identifying whether or not the data was determined by a speculatively executed operation, which was resolve-pending; and
permission control circuitry to control how the data can be used in respect of a further operation according to a security policy while the speculatively executed operation is still resolve-pending,
wherein the speculatively executed operation was issued using control flow speculation.

2. The data processing apparatus according to claim 1, wherein the operation monitoring circuitry is adapted to indicate that the data is other than trusted when identification is made that the data is derived by the speculatively executed resolve-pending operation or by an operation performed using untrusted data.

3. The data processing apparatus according to claim 2, wherein the indication that the data is other than trusted is provided by controlling a speculation flag associated with the data.

4. The data processing apparatus according to claim 3, wherein the identification that the data is derived by an operation performed using untrusted data is provided by controlling a trust flag associated with the data.

5. The data processing apparatus according to claim 4, wherein a speculation flag and the trust flag are indicated by fields of a microoperation passed between stages of an instruction pipeline.

6. The data processing apparatus according to claim 2, wherein the operation monitoring circuitry is adapted, in response to the speculatively executed operation being resolved, to indicate that the data is trusted.

7. The data processing apparatus according to claim 6, wherein the identification that the data is derived by an operation performed using untrusted data is provided by controlling a trust flag associated with the data, and wherein the operation monitoring circuitry is adapted to perform a trust status update operation to update the trust flag to indicate that the data is trusted by updating the trust flag when a speculation flag indicates that the speculatively executed operation is resolved.

8. The data processing apparatus according to claim 7, comprising:

storage circuitry to store a speculation table to indicate, for a series of control flow operations, whether resolution of the series of control flow operations has occurred, wherein the operation monitoring circuitry is adapted to indicate the data as trusted when one or more of the control flow operations that precede the speculatively executed resolve-pending operation are resolved.

9. The data processing apparatus according to claim 1, wherein the operation monitoring circuitry is adapted to indicate that the data is trusted when identification is made that the data was derived from something other than:

a result of a speculatively executed resolve-pending operation; and an operation performed using untrusted data.

10. The data processing apparatus according to claim 1, wherein the permission control circuitry controls use of the data according to the security policy by configuring a control register to indicate whether the data can be used based on at least one of:

whether the further operation would update the state of a given cache;

an operation type of the further operation; and a trust flag of the further operation.

11. The data processing apparatus according to claim 10, wherein the permission control circuitry is adapted to selectively grant permission to the further operation to use the data by performing a permission determination operation by comparing a corresponding portion of the control register with at least one of:

whether the further operation would update the state of a given cache;

the operation type of the further operation; and the trust flag of the further operation.

12. The data processing apparatus according to claim 1, wherein the further operation is a memory access operation to access further data; and the permission control circuitry, based on the security policy, inhibits the use of the data to perform the further operation when the data is untrusted.

13. The data processing apparatus according to claim 1, wherein the permission control circuitry, based on the security policy, stalls execution of the further operation while the data is untrusted.

14. The data processing apparatus according to claim 1, wherein the permission control circuitry, based on the security policy, permits the execution of one or more other operations while the data is untrusted.

15. The data processing apparatus according to claim 1, wherein the permission control circuitry, based on the security policy, treats the further operation as a No Operation (NOOP) operation or a memory prefetch operation when the data is untrusted.

16. The data processing apparatus according to claim 1, wherein the speculatively executed operation is a speculative branch operation.

17. The data processing apparatus according to claim 1, wherein the permission control circuitry, based on the security policy, is adapted to prevent a speculative branch which is dependent on untrusted data.

18. The data processing apparatus according to claim 17, further comprising a plurality of architectural or microarchitectural registers to store an indication of a trust flag.

19. A method, comprising the steps of:

identifying, using operation monitoring circuitry, whether data is trusted or untrusted by identifying whether or not the data was determined by a speculatively executed operation, which was resolve-pending; and controlling, using permission control circuitry, how the data can be used in respect of a further operation according to a security policy while the speculatively executed operation is still resolve-pending, wherein the speculatively executed operation was issued using control flow speculation.

* * * * *